Sept. 25, 1956 E. J. DUNHAM 2,764,449
INDUSTRIAL TRUCK FRAME WITH INTEGRAL FLUID TANK
Filed Oct. 26, 1953 2 Sheets-Sheet 1

INVENTOR.
ELMER J. DUNHAM
BY
Kenneth C. Witt
ATTY.

Sept. 25, 1956     E. J. DUNHAM     2,764,449
INDUSTRIAL TRUCK FRAME WITH INTEGRAL FLUID TANK
Filed Oct. 26, 1953     2 Sheets-Sheet 2

*INVENTOR.*
ELMER J. DUNHAM
BY
Kenneth C. Witt
ATTY.

United States Patent Office 2,764,449
Patented Sept. 25, 1956

2,764,449

INDUSTRIAL TRUCK FRAME WITH INTEGRAL FLUID TANK

Elmer J. Dunham, Battle Creek, Mich., assignor to Clark Equipment Company, a corporation of Michigan Application October 26, 1953, Serial No. 388,379

3 Claims. (Cl. 296—28)

The present invention is concerned with industrial lift trucks, and, more specifically, is directed to a truck frame with unitary fluid tanks.

In presently known industrial trucks, fluid tanks are provided for storing oil, which is employed for actuating the fluid operated devices of the truck, and gasoline, which is consumed by the internal combustion engine of the truck. These tanks are fabricated as units completely separate from the main frame of the truck, and, as will be realized by those acquainted with the problem, are bulky and heavy and thus cannot be located conveniently on the truck.

It is an object of the present invention to provide a truck frame with built-in unitary fluid tanks which are arranged conveniently at the sides of the truck frame within the confines of structural elements.

It is another object of the present invention to employ certain of the structural elements of the truck frame as walls of the fluid tanks.

The form of truck frame which is shown in the present application as embodying my present invention comprises a pair of transversely spaced, vertical, longitudinally extending, main frame side plates interconnected at their forward ends by load supporting frame means. The load supporting frame means includes vertical, laterally inwardly extending, reinforcing plates. Truck body supporting plate means are secured to the main frame side plates at the rear ends thereof and longitudinally extending, vertical tank side plates are employed to interconnect the associated reinforcing plates and body supporting plate means. In addition, tank bottom plates and covers are secured along their peripheries to the associated main frame side plates, reinforcing plates, body supporting plate means and tank side plates for defining a pair of closed fluid storage tanks.

It is to be noted that the structural elements of the truck main frame serve as the ends and one side wall of each fluid tank thus minimizing the material required to fabricate the tanks and permitting the tanks to be built into the confines of the main frame at the sides thereof.

Now, in order to acquaint those skilled in the art with the manner of constructing and using truck frames in accordance with the principles of my present invention, I shall describe in connection with the accompanying drawings, a preferred embodiment of my invention.

Figure 1:
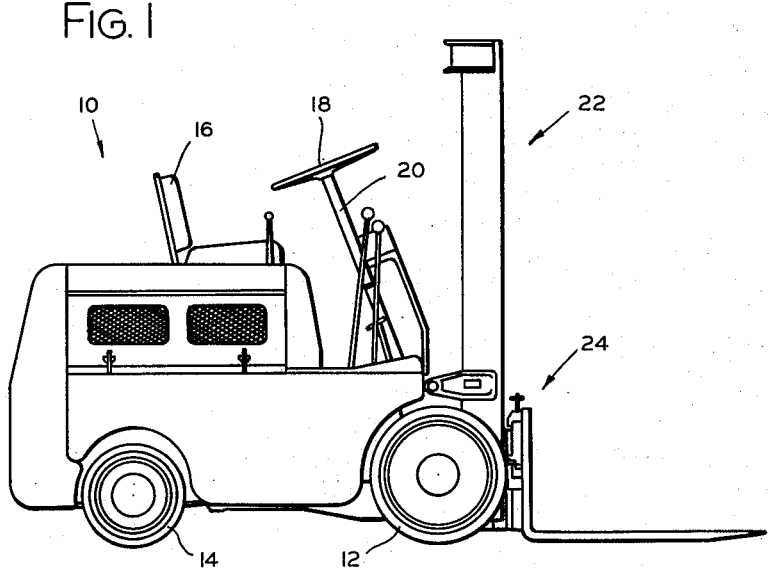
Figure 1 is a side elevational view of an industrial truck with which my present invention has been embodied.

Referring now to the drawings, there is shown an industrial truck, indicated generally by the reference numeral 10, which has a pair of driving wheels 12 disposed adjacent the forward end thereof and a pair of steering wheels 14 disposed adjacent the rear end thereof. Mounted on the industrial truck 10 is a driver's seat 16 and arranged forwardly thereof is a hand steering wheel 18 which is mounted at the upper end of a steering column 20 and is operatively connected through suitable linkage means to the rear steering wheels 14.

Secured to the main frame of the industrial truck 10, at the forward end thereof, is a substantially vertically extending mast construction, indicated generally by the reference numeral 22, which is of conventional construction. Mounted for vertical movement within the mast construction 22 is a load supporting carriage, indicated generally at 24, which is adapted to receive, interchangeably, various forms of load supporting and gripping devices.

Figure 4:
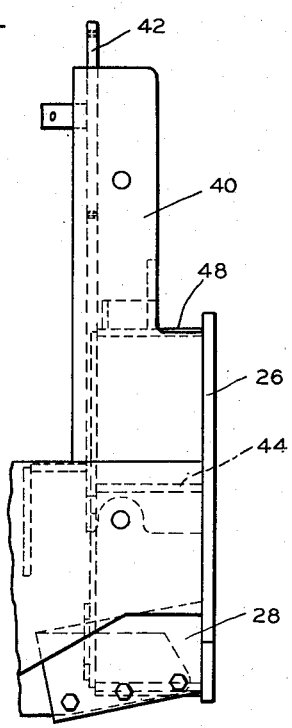
Figure 4 is a partial end view of the truck frame and unitary fluid tanks of Figure 2.
Figure 2:
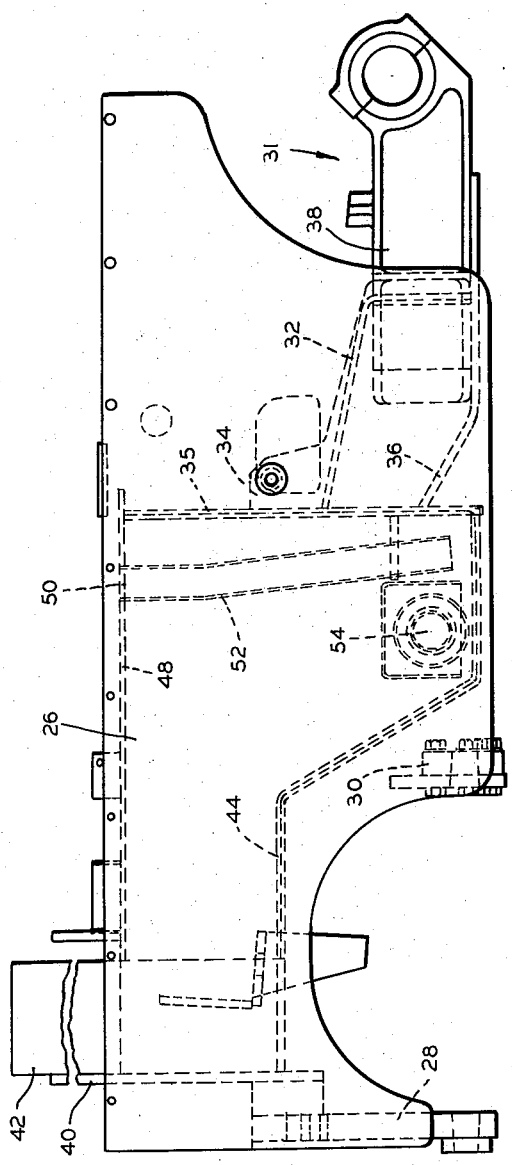
Figure 2 is a side elevational view of the truck frame and unitary fluid tanks of my present invention.
Figure 3:
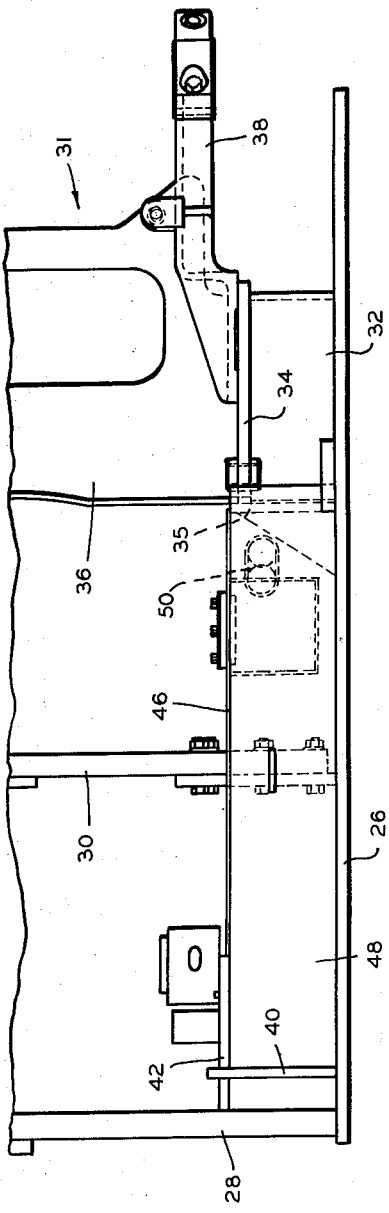
Figure 3 is a partial plan view of the truck frame and unitary fluid tanks of Figure 2.

Referring now particularly to Figures 2, 3 and 4, I shall describe the details of construction of the main frame of the truck 10 which embodies the unitary fluid tanks of my present invention.

The main frame of the truck 10 comprises a pair of laterally spaced, vertical, longitudinally extending side plate members 26 which have portions cut away adjacent their forward and rear ends to accommodate the truck wheels 12 and 14. The side plate members 26 are interconnected by means of transverse rear brace means 28, transverse intermediate brace means 30 and load supporting frame means indicated generally at 31.

The load supporting frame means 31 comprises gusset plates 32 which are secured to the inboard sides of the plates 26, adjacent the forward ends thereof. Secured to the gusset plates 32, along the inner edges thereof, are vertical bracket plates 34. The rear edges of each pair of associated plates 32 and 34 are secured to a vertical laterally inwardly extending, reinforcing plate 35, which is suitably secured to the inboard side of the adjacent side plate 26. The lower edges of the bracket plates 34 are interconnected by forward transverse brace means 36. Also secured to, and projecting forwardly from, the bracket plates 34 and brace means 36 are laterally spaced hanger assemblies 38 which support the afore-mentioned mast construction 22 at the lower end thereof.

At the rear end of the main frame, vertical, laterally inwardly projecting web plates 40 are secured one to the inboard side of each side plate 26. The rear edges of vertical, forwardly extending body supporting plates 42 are secured to the forward surfaces of the plates 40. The plates 42 are spaced inwardly of the side plates 26 and, together with the plates 40, project some distance above the side plates 26 for supporting various body elements of the industrial truck.

Additional members are incorporated with the aforenoted structure so as to define fluid storage tanks which are integral with the main frame of the truck. More specifically, tank bottom plates 44 are secured at their rear ends to the body supporting plates 40. The plates 44 extend generally horizontally for a distance, then downwardly at an angle, and finally horizontally again. The forward ends of the tank bottom plates 44 are secured to the reinforcing plates 35 and the plates 44 along one side are suitably fixed to the inboard sides of the side plates 26. The plates 44 along their innermost sides are fixed to the lower edges of vertical tank side plates 46 which extend between the adjacent body supporting plates 42 and the reinforcing plates 35. To provide a closure for the fluid tanks, cover members 48 are provided which are sealed along their edges to the plates 26, 35, 40, 42 and 46.

A suitable inlet 50 is formed in each tank cover member 48 and extending downwardly therefrom is a fluid inlet tube 52. A fluid outlet 54 is formed in each tank side plate 46.

Preferably, the tank at one side of the truck is employed for storing gasoline while the tank at the other side of the truck is employed for storing oil. This arrangement, of course, may be varied to meet various operating requirements.

From the foregoing description, it will be apparent that I have provided fuel and oil storage tanks which may be fabricated from inexpensive plate members with the major component parts thereof being made up of structural elements of the main frame of an industrial truck. This construction reduces the material required to fabricate the tanks and permits the tanks to be conveniently and compactly arranged at the sides of the truck integral with the main frame thereof.

Now, while I have shown and described what I believe to be a preferred embodiment of my present invention, it will be understood that various rearrangements and modifications may be made therein without departing from the spirit and scope of my invention.

I claim:

1. For use in an industrial truck, a main frame with unitary fluid tanks comprising a pair of transversely spaced vertical longitudinally extending main frame side plates, vertical laterally inwardly extending plate members secured to said main frame side plates adjacent the forward ends thereof, vertical plate means mounted to the inboard sides of said main frame side plates adjacent the rear ends thereof, longitudinally extending vertical tank side plates interconnecting the associated plate members and plate means, tank bottom plates sealed along their peripheries to the associated main frame side plates, plate members, plate means and tank side plates, and tank covers sealed along their peripheries to the associated main frame side plates, plate members, plate means and tank side plates.

2. For use in an industrial truck, a main frame with a unitary fluid tank comprising a vertical longitudinally extending main frame side plate, load supporting frame means including a vertical laterally inwardly extending reinforcing plate secured to the inboard side of said main frame side plate adjacent the forward end thereof, vertical truck body supporting plate means mounted to the inboard side of said main frame side plate adjacent the rear end thereof, a longitudinally extending vertical tank side plate interconnecting the associated reinforcing plate and body supporting plate means, a tank bottom plate sealed along its periphery to said main frame side plate, reinforcing plate, body supporting plate means and tank side plate, and a tank cover sealed along its periphery to said main frame side plate, reinforcing plate, body supporting plate means and tank side plate.

3. For use in an industrial truck, a main frame with unitary fluid tanks comprising a pair of transversely spaced vertical longitudinally extending main frame side plates, load supporting frame means interconnecting the forward ends of said main frame side plates, said load supporting frame means including vertical laterally inwardly extending reinforcing plates, vertical truck body supporting plate means mounted to the inboard sides of said main frame side plates adjacent the rear ends thereof, longitudinally extending vertical tank side plates interconnecting the associated reinforcing plates and body supporting plate means, tank bottom plates sealed along their peripheries to the associated main frame side plates, reinforcing plates, body supporting plate means and tank side plates, and tank covers sealed along their peripheries to the associated main frame side plates, reinforcing plates, body supporting plate means and tank side plates.

References Cited in the file of this patent

UNITED STATES PATENTS

| | | |
|---|---|---|
| 2,111,563 | Kliesrath | Mar. 22, 1938 |
| 2,235,228 | Lutz | Mar. 18, 1941 |
| 2,561,576 | Johnson | July 24, 1951 |